UNITED STATES PATENT OFFICE.

WILLIAM FRISHMUTH, OF PHILADELPHIA, PENNSYLVANIA, ASSIGNOR, BY DIRECT AND MESNE ASSIGNMENTS, TO RUDOLPHE DE MONTGELAS, WILLIAM H. GAW, J. HINCKLEY CLARK, RUDOLPH ELLIS, HENRY JUNGERICH, AND GEORGE C. POTTS, ALL OF SAME PLACE.

PROCESS OF MAKING ALUMINIUM CHLORIDE.

SPECIFICATION forming part of Letters Patent No. 359,601, dated March 22, 1887.

Application filed October 20, 1886. Serial No. 216,712. (No specimens.)

*To all whom it may concern:*

Be it known that I, WILLIAM FRISHMUTH, of the city and county of Philadelphia, State of Pennsylvania, have invented a new and useful Improvement in Processes for the Manufacture of Chloride of Aluminium and Double Chloride of Aluminium and Sodium, of which the following is a full, clear, and exact specification.

My invention consists in a new process for the production from oxide of aluminium (alumina, $Al_2O_3$,) both aluminium chloride and the double chloride of aluminium and sodium. The resulting products are especially adapted to be the subjects of further processes for the extraction of the metallic aluminium.

I practically put my aforesaid process into effect and operation in the following manner: Aluminium oxide, chloride of sodium, and carbon—the latter preferably in the form of charcoal—after being reduced to pulverulent or comminuted form, are combined intimately in equal parts by weight. Molasses is added as a binding material, and the mass, being thus moistened, is made into a paste. This paste is dried in any suitable way—as, for example, on a steam-table—and by any suitable means is molded into lumps of about three or four cubic inches each. After the lumps are formed, as described, they are dried to remove all dampness, and are then subjected to a white heat in closed crucibles. This results in the carbonization of the molasses and charcoal. Finally the lumps are cooled and are then ready for the retorts.

It is important to note here that the carbonizable material must be such as will continue to bind together the ingredients of the lumps after carbonization, so that the compound shall remain in such lump form during distillation in the retort. If this precaution is neglected, and if, for example, the ingredients be mixed simply with water, then, on submitting the compound to a high temperature, the water will be driven off and the materials will be in a disintegrated condition. In this condition they will lie on the bottom of the retort and the chlorine will not freely permeate the mass, so that the yield of distillate will be materially reduced.

The retorts may be of any desired construction and material, and are provided with means for conducting chlorine gas to their contents. This gas is passed over the lumps in the retort while said lumps are maintained at a cherry or bright red heat. This operation may continue for from sixteen to eighteen hours. The result is the production of chloride of aluminium, which distils over in the form of a yellow powder, and of double chloride of aluminium and sodium, which remains in the retort. About two parts of chloride to one part of double chloride are thus obtained.

I may omit the sodium chloride as an ingredient of the mixture first above mentioned, using simply the oxide of aluminium and charcoal in equal parts with molasses, as before. The treatment is the same as already described; but, of course, only the chloride of aluminium, and not double chloride of aluminium and sodium, is produced. So, also, in lieu of sodium chloride, I may substitute in the same proportion carbonate of soda or soda-ash. I may also use either animal or vegetable charcoal. I may prepare the chlorine gas by any known process, taking care, however, to wash, dry, and cleanse the gas before admitting it to the retort.

I do not claim herein the subject-matter of Deville's process for manufacture of aluminium chloride, which appears in Wurz' Dictionary of Chemistry, vol. 1, p. 172.

I claim—

1. The process of producing aluminium chloride, substantially as hereinbefore set forth, which consists in combining aluminium oxide and carbon with a carbonizable agglutinating material, subjecting said compound, in a separate vessel, to a temperature sufficiently high to carbonize the carbonizable substances therein, and then distilling said compound in a retort in the presence of chlorine gas.

2. The process of producing aluminium chloride and the double chloride of aluminium and sodium, substantially as hereinbefore set forth, which consists in combining aluminium oxide, sodium chloride, carbon, and a carbonizable agglutinating material, forming said compound into lumps, subjecting said compound, in a separate vessel, to a temperature sufficiently high to carbonize the carbonizable substances in said compound without disintegrating said lumps, and distilling said compound in the presence of chlorine gas.

3. The process of producing aluminium chloride and the double chloride of aluminium and sodium, substantially as hereinbefore set forth, which consists in combining aluminium oxide, chloride of sodium, charcoal, and molasses, forming said compound into lumps, in a separate vessel, subjecting said lumps to a temperature sufficiently high to carbonize the carbonizable substances in said compound without disintegrating said lumps, and distilling said compound in the presence of chlorine gas.

WILLIAM FRISHMUTH.

Witnesses:
R. MONTGELAS,
W. H. GAW.